United States Patent
Crockett et al.

(10) Patent No.: US 6,736,370 B1
(45) Date of Patent: May 18, 2004

(54) DIAPHRAGM VALVE WITH DYNAMIC METAL SEAT AND CONED DISK SPRINGS

(75) Inventors: Mark Crockett, Foster City, CA (US); Michael DeChellis, Washington, TX (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/328,135

(22) Filed: Dec. 20, 2002

(51) Int. Cl.$^7$ ................................................. F16K 7/17
(52) U.S. Cl. .................... 251/331; 251/129.17
(58) Field of Search ................ 251/331, 63.5, 251/129.17

(56) References Cited

U.S. PATENT DOCUMENTS

| | | | | |
|---|---|---|---|---|
| 4,828,219 A | | 5/1989 | Ohmi et al. ................. | 251/118 |
| 5,007,328 A | * | 4/1991 | Otteman ..................... | 251/63.5 |
| RE34,303 E | * | 7/1993 | Ohmi et al. ................. | 251/331 |
| 5,755,428 A | | 5/1998 | Ollivier ...................... | 251/331 |
| 5,762,086 A | * | 6/1998 | Ollivier ...................... | 251/331 |
| 6,062,246 A | | 5/2000 | Tanaka et al. ................ | 137/12 |
| 6,357,339 B1 | * | 3/2002 | Ejiri ........................... | 251/63.5 |
| 6,357,760 B1 | | 3/2002 | Doyle ......................... | 277/604 |
| 6,390,442 B2 | * | 5/2002 | Tokuda et al. .............. | 251/63.5 |

FOREIGN PATENT DOCUMENTS

| | | | |
|---|---|---|---|
| DE | 112821 B | 6/1980 | ........... F16K/17/04 |
| DE | 19703169 | 7/1998 | ........... F02M/25/07 |
| JP | 8075017 | 3/1996 | ............. F16K/7/16 |
| JP | 11101352 | 4/1999 | ............. F16K/7/26 |
| JP | 11194833 | 7/1999 | ............. G05D/7/06 |
| WO | WO 01/14775 | 3/2001 | ........... F16K/31/04 |

OTHER PUBLICATIONS

D. Robinson et al., "Actuated Diaphragm Valves for Control Applications," Papers Presented at the International Conference on Developments in Valves & Actuators for Fluid Control, published by BHRA, Cranfield, England, pp. 97–117 (1985).

N. Sidell et al., "The design and construction of a high temperature linear electromagnetic actuator," Journal of Applied Physics, vol. 85, No. 8, 2A, pp. 4901–4903(Apr. 1999).

V.A. Bubnov, "Calculation of flow rate characteristics for controlling the hydraulic drive of a machine tool," Soviet Engineering Research, vol. 10, No. 11, pp. 90–96 (1990).

\* cited by examiner

*Primary Examiner*—Paul J. Hirsch
(74) *Attorney, Agent, or Firm*—Shirley L. Church

(57) ABSTRACT

The disclosure pertains to a compact integrated fluid control valve useful in controlling process fluids handled as part of a semiconductor processing operation. In the wetted section of the valve, process fluids enter through one or more entrance ports and exit through an annular metallic valve seat. In the valve's drive section, a sliding cylinder, including an upper horizontal member tied to a lower horizontal member, moves up and down. The lower horizontal member presses a diaphragm against the valve seat to close the valve, and moves away from the valve seat to permit fluid flow through the valve. A spring presses at the top of the upper horizontal member of the sliding cylinder, while a controlled pneumatic pressure is applied at the bottom of the upper horizontal member. The balance between the force of the spring and the force of the pneumatic pressure determines the extent to which the valve is open.

11 Claims, 5 Drawing Sheets

DIAPHRAGM VALVE WITH DYNAMIC METAL SEAT AND CONED DISK SPRINGS

FIELD OF THE INVENTION

The present invention pertains to an integrated flow-control valve of compact design, adapted for precisely controlling the flow of gases in semiconductor processing applications.

BRIEF DESCRIPTION OF THE BACKGROUND ART

In applications such as semiconductor processing, valves for fluid flow control must exhibit several particular capabilities. First, they must provide precise control of fluid flow volumes, including virtually absolute shutoff to as little as about $10^{-7}$ sccm, as well as virtually zero outleakage to the environment of often extremely toxic and corrosive process fluids. They must also maintain the required high purity of the fluids, contributing no appreciable amount of particulates, which are typically generated by wearing parts within the wetted portion of the valve. They must possess good resistance to corrosive properties of the fluids. Due to the toxicity of a number of the fluids transported, very high reliability and long service life (avoidance of the need to shut down and change out parts) are of great importance. Less important, but still highly desirable, are a compact design which requires limited space, and a reasonable cost.

For semiconductor applications, a valve body where all of the fluid-wetted parts are fabricated from a highly corrosion-resistant alloy has distinct advantages. Process control valves frequently employ corrosion-resistant plastic or elastomeric valve seats. Metal valve seats provide advantages in terms of minimizing valve seat maintenance and maintaining fluid purity; however, metal valve seats require high seating forces, compared to polymeric seats, in order to reliably provide a tight shut-off. As a result, all valves with metal valve seats are typically larger in size and cost significantly more than valves with polymeric seats.

One example of a valve having metal-to-metal seating for controlling the flow of a gas employs a flexible metal diaphragm mounted in the valve so the diaphragm can be moved into and out of sealing contact with the metal seat to close and open a gas passage, respectively. The valve seat has a rounded metal sealing projection with a relatively small cross-sectional radius around the seating section extending about the gas flow passage. The flexible metal diaphragm is moved into and out of sealing contact with the metal sealing projection of the seat by an actuator which employs a metal backing member which forcefully contacts the diaphragm during narrowing or closing of the gas flow passage. The metal sealing projection of the seat is formed of a relatively soft metal and each of the flexible metal diaphragm and the metal backing member of the actuator is formed of relatively hard metal. The metal backing member has a contour which is convexly rounded at a surface which contacts the diaphragm on the side of the diaphragm opposite the sealing projection of the metal seat. For additional information about this all-metal valve, one skilled in the art should refer to U.S. Pat. No. 5,755,428, of Louis Ollivier, issued May 26, 1988.

As described above, the potential problems of process fluid outleakage and/or process fluid attack on valve mechanicals may be addressed using a diaphragm valve (among other closing techniques). A thin diaphragm or membrane may be used to form a leak-tight seal between the portion of the valve interior through which process fluid passes (the "wetted section" of the valve), and the portion of the valve body containing the moving mechanisms that open and close the valve (the "drive section" of the valve). The diaphragm is pressed against the valve seat by a moving stem or the like to effect closure of the valve. When the valve seat is metal, a particularly high seating force is required, compared with polymeric valve seats. The valve is typically operated in a normally-closed position, to provide a "fail safe" condition in the event of a loss of motive power (electric or pneumatic) to the actuator. The normally-closed condition requires application of a force against the diaphragm, with the actuator designed to overcome the force in order to open the valve. When the actuator design incorporates a spring (or springs) capable of applying the large force required for a metal valve seat, the spring is typically large, on the order of 3 cm to 10 cm tall, and the valve itself is expensive, often costing around 5–6 times the price of a comparable capacity plastic-seated valve.

It would be highly desirable to have a highly corrosion-resistant fluid on/off valve, where all of the fluid-wetted parts are metal; where the valve is compact in design; and, where the valve price is competitive with valves having fluid-wetting parts fabricated from materials other than metal (or where the valve price is competitive in terms of long-term operational costs).

SUMMARY OF THE INVENTION

The present invention pertains to the design of a compact integrated fluid on/off valve, adapted for use in controlling process fluids in semiconductor processing operations. The fluid-wetted surfaces of the valve are fabricated from a corrosion-resistant metal or metal alloy, including a metallic diaphragm separating the wetted section of the valve from the non-wetted drive section of the valve. In the wetted section, process fluids enter through one or more entrance ports. The exit port from the wetted section comprises an annular metallic valve seat. The valve seat is formed as, or upon, an inner lip of the exit port. When the valve is closed, the fluid flow is interrupted by a section of the diaphragm being pressed tightly against the valve seat.

The metal valve seat is advantageously a dynamic seat which deforms elastically when pressed upon by the diaphragm and its backing disk, so that the seat recovers each time the valve is closed and reopened, rather than being permanently deformed by the valve's closure.

In the valve's wetted section, metal-to-metal bonding can advantageously be accomplished by diffusion bonding. Diffusion bonding is a direct bonding process which provides smooth, strong bonds that do not absorb or release process fluids, and do not contribute impurities to the process fluids, as a welded joint might do. It is important that no adhesive (or adhesive residue) be present on the wetted flow path. The diffusion bonding permits the formation of complex shapes without costly machining.

In order for diffusion bonding to be effective, the metal surfaces that are to be bonded must have a surface roughness within the range of about 0.5 Ra to about 30 Ra prior to diffusion bonding. Typically, the metal surfaces have a surface roughness within the range of about 0.5 Ra to about 10 Ra; more typically, within the range of about 1.5 Ra to about 5 Ra. We have found that diffusion bonding works quite well when the metal surfaces have a surface roughness within the range of about 1.5 Ra to about 3.0 Ra.

In many cases, the metal surfaces will need to be pre-treated by chemical etching, or a combination of mechanical planarization and chemical etching, to have the desired surface roughness prior to diffusion bonding. For example, stainless steel can be chemically etched using ferric chloride according to standard methodology known in the art. A process for electrochemical etching of difficult to etch materials such as HASTELOY is described in U.S. Pat. No. 6,221,235, issued Apr. 24, 2001, to Gebhart. Certain materials may require mechanical planarization to smooth down the surface prior to the performance of a chemical etching process to obtain a surface roughness within the desired range. Mechanical planarization of metal surfaces can be performed according to techniques known in the art.

In some instances, the metal surfaces may be manufactured with the desired surface roughness, and may need no chemical or mechanical pretreatment prior to diffusion bonding. For example, the ASTM standard for surface roughness for stainless steel sheets (as rolled) is 0.5 Ra to 4.0 Ra (ASTM 480 BA).

In the valve's non-wetted drive section, a sliding cylinder moves up and down, pressing a lower horizontal member, which typically includes a convex contacting surface, against a diaphragm, which is in turn pressed against the valve seat to close the valve. The diaphragm is permitted to move away from the valve seat to open the valve. The sliding cylinder has an upper horizontal member connected to a smaller, lower horizontal member by a vertical member. The sliding cylinder may be of single piece construction. The valve is maintained in a normally-closed position by a spring force applied at the top of the upper horizontal member of the sliding cylinder. The spring drives the lower horizontal member of the sliding cylinder, which includes a convex surface (acting as a backing disk), against the diaphragm. The sliding cylinder has a gas-tight seal around the perimeter of both the upper horizontal member and the lower horizontal member. A typical gas-tight seal is a polymeric "O"-ring. The valve is opened by pneumatic force from a pressurizing gas which is applied in a space between the upper horizontal member and the lower horizontal member of the sliding cylinder. When the pressurizing gas is applied within the space, the pressurizing gas acts to compress a spring or spring assembly located above the upper horizontal member, permitting the sliding cylinder to rise, and permitting the diaphragm beneath the lower horizontal member to rise above the metallic seat, enabling fluid to flow through the annular opening within the metallic seat.

The use of Belleville springs to provide the closing force permits a much more compact valve actuator than the use of coil springs.

In the drive section of the valve which is not wetted by fluids, metal-to-metal bonding may be advantageously accomplished using high-strength adhesives, which do not require subjecting valve mechanicals to the increased temperatures and pressures involved in performing the diffusion bonding used in the wetted section, and which provide a simpler and cheaper alternative to diffusion bonding.

DETAILED DESCRIPTION OF THE INVENTION

As a preface to the detailed description, it should be noted that, as used in this specification and the appended claims, the singular forms "a", "an", and "the" include plural referents, unless the context clearly dictates otherwise. When the term metal or metallic is used, it is understood that this includes metal alloys. Other terms important to an understanding of the invention are defined in context throughout the application.

Figure 1:
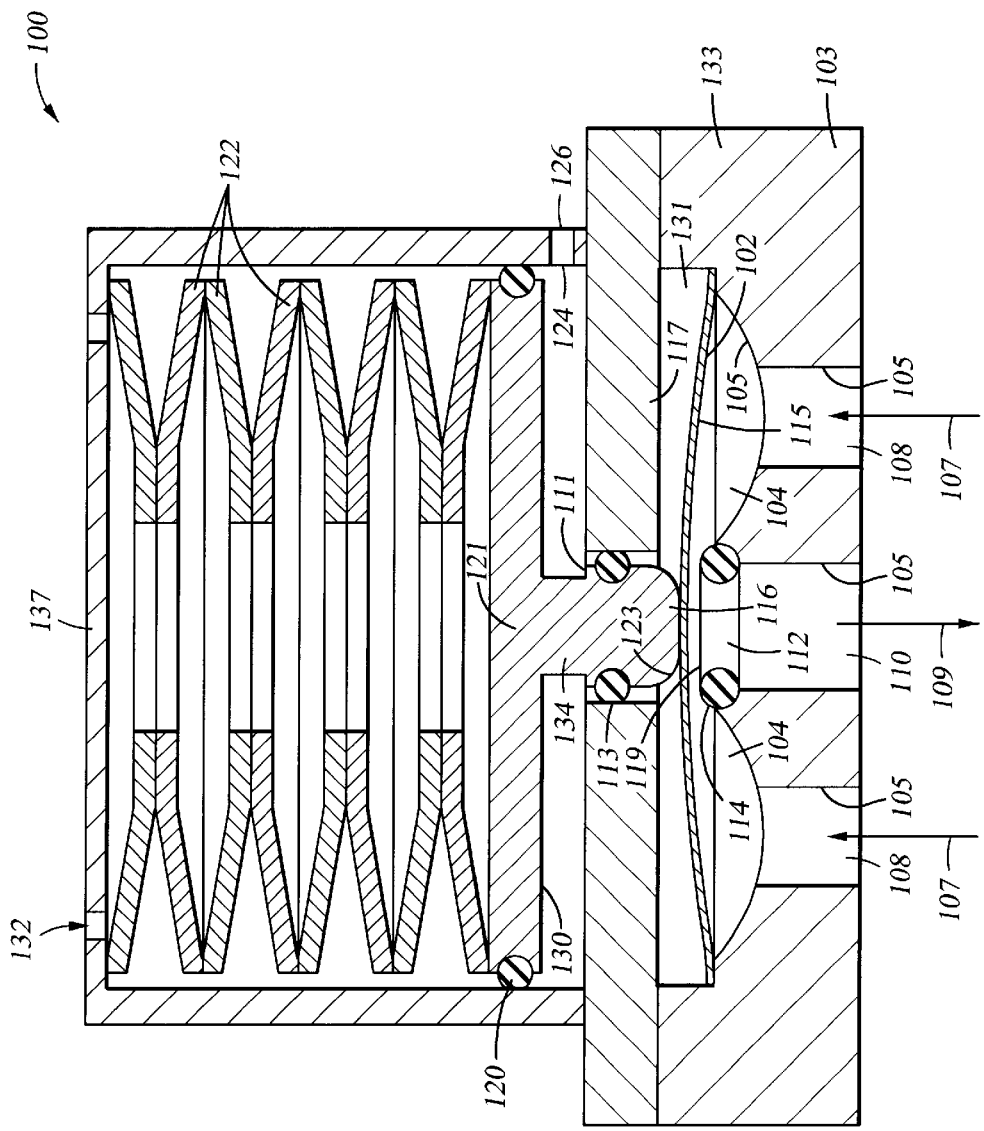
FIG. 1 is a schematic diagram of a cross-sectional view of one embodiment of the inventive control valve.
Figure 2:
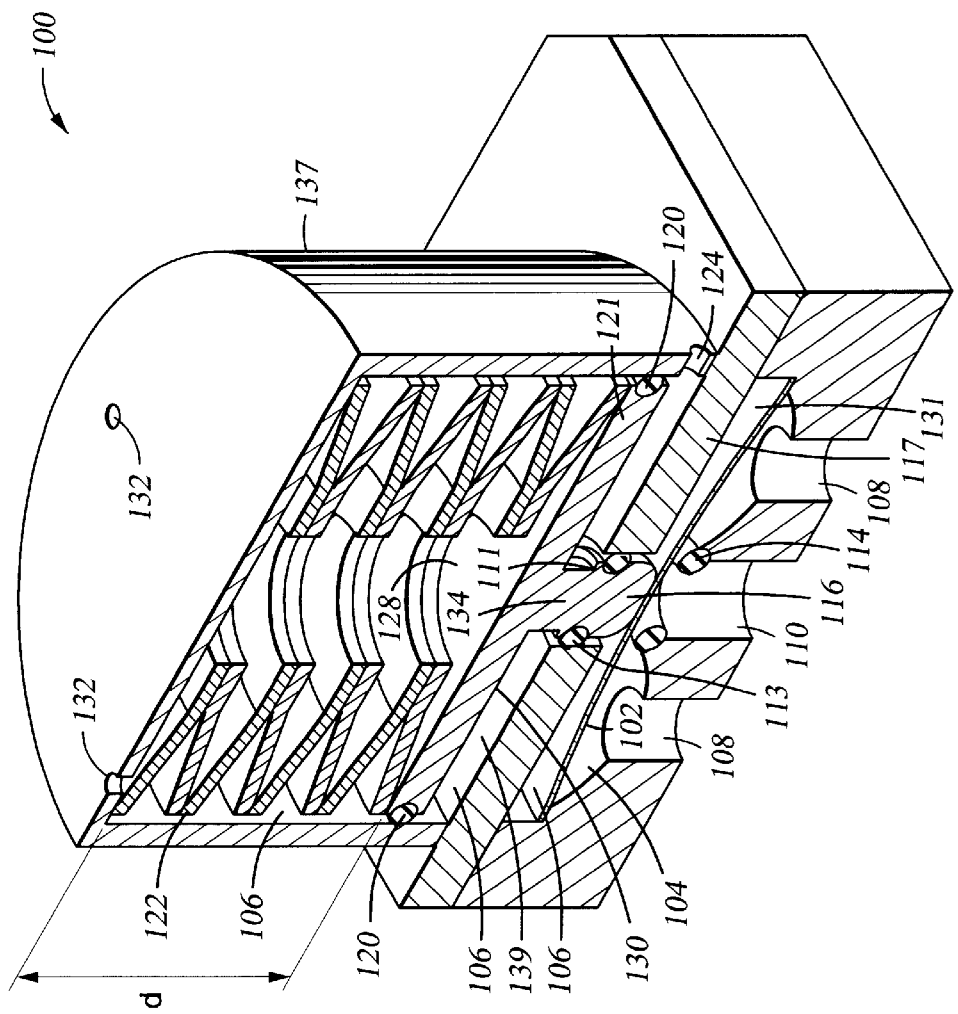
FIG. 2 is a schematic diagram of a three-dimensional side view of the embodiment control valve 100 shown in FIG. 1.

As described above, the present invention pertains to the design of a compact integrated fluid control valve, adapted for use in controlling process fluids in semiconductor processing operations. FIGS. 1 and 2 illustrate one embodiment valve 100 which incorporates the inventive features contemplated herein. In FIGS. 1 and 2, all of the valve parts which contact fluid flowing through the valve are metallic. Typically, the metallic material is highly corrosion-resistant. Valve 100 includes a metal diaphragm 102 separating the wetted section 104 of the valve 100 from the drive section 106 of the valve 100. The metal diaphragm 102 provides a seal against metal valve seat 114 when the valve 100 is in its normally-closed position. Once a fluid, illustrated by arrow 107, has entered through entrance port 108, lower surface 115 of diaphragm 102 is in contact with the fluid, both when valve 100 is open or closed. It is advantageous to use a corrosion-resistant material on surface 115 of diaphragm 102. The diaphragm 102, in addition to being highly corrosion-resistant, must also have good flexure characteristics if it is to survive long periods of numerous open-close cycles. To ensure that there will be no leakage into the environment, leakage of process gas from the wetted section 104 of the valve 100 into the drive section 106 of the valve 100 must be $1\times10^{-9}$ cc/sec or less (SEMI F1 standard) for at least 15 seconds, at a pressure difference of 1 atm He across the valve. With respect to chamber 131, which is the low pressure, atmospheric side of the diaphragm 102, this chamber is typically vented to atmosphere using techniques known in the art, so that pressure cannot build up.

The metal diaphragm 102 can advantageously be fabricated of a nickel-cobalt alloy, such as ELGILOY, Spron 510, Spron 100, HASTELOY, or INCONEL. The diaphragm can be either a single thickness or a laminate. In many cases, the diaphragm will be multi-layered, with two to three diaphragms layered (not necessarily bonded) together. Multi-layered diaphragms provide a better seal and add springiness. An individual diaphragm will typically have a thickness within the range of about 0.001 to about 0.007 inch (0.1 mil to 7 mil). The individual diaphragms within a multi-layered diaphragm will typically (but not necessarily) be of the same material. Alternatively, instead of using a multi-layered diaphragm, an individual diaphragm that has been machined to be of variable thickness may be used.

The diaphragm 102 is held in place by its edge being retained between the lower wetted body section 103 and the non-wetted drive body section 117. The joint between the diaphragm 102 and the wetted body section 103 is typically diffusion bonded. Alternatively, the joint may be bonded using a chemical bonding agent, such as a high-strength epoxy. However, diffusion bonding typically provides a stronger and more reliable bond.

The lower body section 103 of valve 100 includes surfaces 105 which are wetted by fluids passing through the valve 100. Typically, it is advantageous to form lower body section 103 from a corrosion-resistant metal or metal alloy, such as 316L stainless steel, HASTELOY C-22° (a registered trademark of Haynes International, Inc. of Kokomo, Ind.), INCONEL® (a registered trademark of the Special Materials Metal Corp., a group of companies, having offices in New Hartford, N.Y.), and ELGILOY® (a registered trademark of Elgiloy Specialty Metals, Elgin, Ill.). These same materials maybe used to fabricate diaphragm 102. As previously mentioned, diaphragm 102 must be somewhat flexible, the thickness of the diaphragm typically ranges from about 0.025 mm to about 0.18 mm; and, in the embodiments described herein, the diaphragm was about 0.1 mm thick.

The drive section 106 of valve 100 maybe fabricated of these same materials, or may be fabricated from less expensive materials which are not as corrosion-resistant, since the surfaces of components of drive section 106 are not wetted by fluids which flow through the valve 100. By way of example, housing 137 and sliding cylinder 121 may be fabricated from aluminum and stainless steel. However, the cone disk springs 122 are typically made from a nickel-cobalt-chrome alloy.

The various parts of the valve will now be described, with respect to FIGS. 1 and 2, in terms of their function during operation of the valve.

The process fluid (or fluids), indicated by arrows 107, enter through an entrance port 108 (ports 108) present within lower body section 103 of the valve 100. In doing so, the process fluid contacts surfaces 105 of lower body section 103 within wetted section 104. When the valve 100 is in an open or partially-open position, permitting fluid to flow through the valve 100, exiting fluid, illustrated by arrow 109, will flow out of exit port 110, over inner lip 112 of annular metallic valve seat 114.

When the valve 100 is in the closed position, the fluid flow is interrupted by a section of the diaphragm 102 being pressed tightly against an upper surface 119 of the metal valve seat 114 by lower horizontal member 116 of sliding cylinder 121. The lower surface 123 of lower horizontal member 116 is convex-shaped, so that it can act as a backing disk behind diaphragm 102. Lower horizontal member 116 is considered to be part of drive section 106, since lower horizontal member 116 is not wetted by fluids passing through valve 100. The diaphragm 102 may be free-moving, or may be bonded to the convex surface 123 of lower horizontal member 116, for example, by e-beam welding, or direct bonding, or other bonding techniques known in the art. The convex surface 123 of lower horizontal member 116 which contacts diaphragm 102 is typically made of a material which has a hardness less than that of the diaphragm material. If the diaphragm 102 is made of a nickel-cobalt alloy (for example, and not by way of limitation, ELGILOY, Spron 510, Spron 100, HASTELOY, or INCONEL), the convex surface 123 may be made of 304 stainless steel, by way of example, and not by way of limitation.

The metallic valve seat 114 is formed as part of, or upon, the inner lip 112 of the exit port 110. Depending upon its design, the metal valve seat 114 may be advantageously fabricated from metal or a metal alloy, such as, for example and not by way of limitation, stainless steel, ELGILOY, Spron 100, or Spron 510. Most typically, the metallic valve seat 114 is fabricated from 316L stainless steel. Metallic valve seat 114 may be, for example, any of the commercially available C-seals, such as, by way of example and not by way of limitation, the MICROSEAL® ring seal available from Microflex Technologies LLC., which is shown in FIG. 4 and described in detail in U.S. Pat. No. 6,357,760, issued Mar. 19, 2002, to Doyle. Because of its particular geometry, the MICROSEAL® ring seal typically has a better elastic range than many other commercially available seals, providing a flexibility which is desirable for use in a valve seat of the present invention.

Figure 4A:
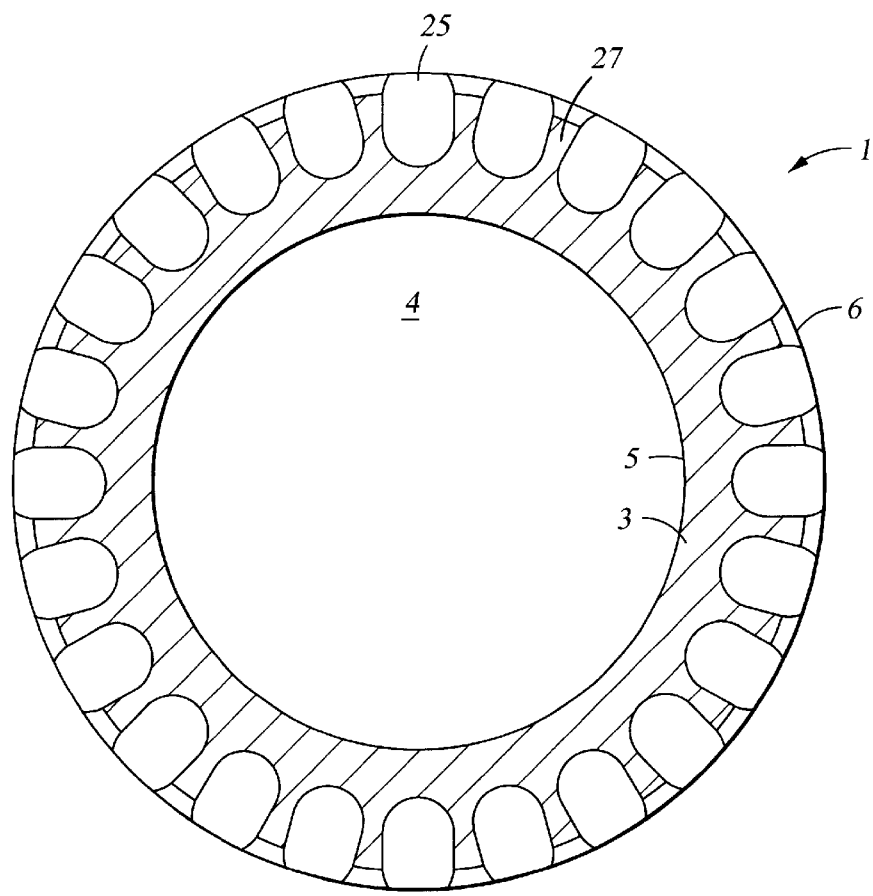
FIG. 4A is an enlarged view of one embodiment of a ring seal, which can be used as a metallic valve seat in an embodiment of a control valve of the present invention.
Figure 4B:
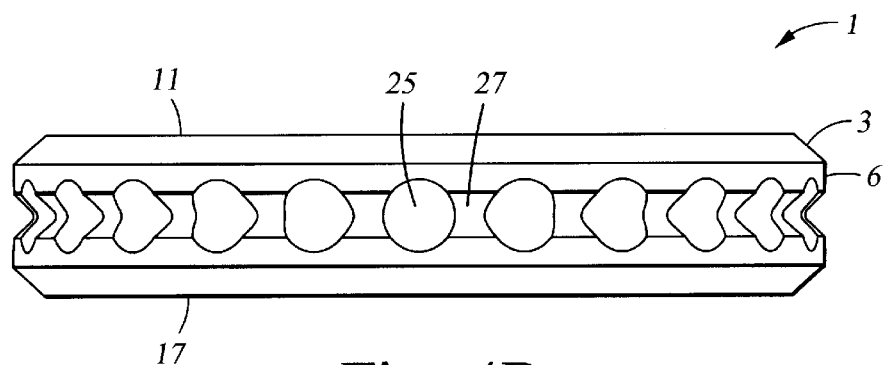
FIG. 4B is a side view of the ring seal shown in FIG. 4A.

With reference to FIG. 4A, the ring seal shown, which is useful as a valve seat in the present inventive valve, has an annular shaped body element 3, with an axial aligned center hole 4 for permitting the passage of gases or fluids therethrough. The seal includes a radial inner surface 5, a radial outer surface 6, a first axial surface 11, and a second axial surface 17, as shown in FIG. 4B. Each of these surfaces may take any number of configurations.

The ring seal shown in FIGS. 4A and 4B further includes a plurality of bores 25 which project inwardly from the seal's radial outer surface 6 toward the seal's center hole 4. The non-axially aligned sidewalls 27 which form bores 25 are believed to be particularly suited where the application for the seal requires significant deformation for a particular load, and this kind of ring seal performs very well in the valve of the present invention. Other ring-shaped seals may also be used, and it is not intended that the valve design be limited to one employing the particular ring seal described above.

In addition to its high corrosion resistance, the metallic valve seat 114 has the property of being a dynamic seat. The seat is designed, and its material or materials of construction selected, to deform sufficiently to seal off the exit port 110 to the required level of cross-seat leakage, when pressed upon by the diaphragm 102. When valve 100 is in the normally-closed position, it is required that the cross-seat leakage level is no more than about $1 \times 10^{-9}$ cc/sec or less (SEMI F1 standard) for at least 15 seconds, at a pressure difference of 1 atm He across the valve. Preferably, the metallic seat 114 deformation remains in the elastic regime, so that the metallic seat 114 recovers each time the valve 100 is closed and reopened, rather than being permanently deformed by the valve's closure. It is anticipated that this feature will greatly increase the valve's reliability and useful lifetime.

Bonding of the valve 100 non-wetted drive body section 117 to the lower wetted body section 103, and bonding of a metallic valve seat 114 to an inner lip 112 of an annular metallic valve seat 114, may be advantageously accomplished by diffusion bonding. Diffusion bonding is a direct bonding process which provides smooth, strong bonds that do not absorb or release process fluids, and do not contribute impurities to the process fluids, as a welded joint might do. A process for diffusion bonding two metallic components involves finishing their mating faces to a very clean, smooth, and flat surface finish, then applying pressure and heating the components until the atoms of the respective surfaces interdiffuse, forming an interlocked layer, without liquefying either of the surfaces or introducing any voids, pits, or inclusions.

In order for diffusion bonding to be effective, the metal surfaces that are to be bonded must have a surface roughness within the range of about 0.5 Ra to about 30 Ra prior to diffusion bonding. Typically, the metal surfaces have a surface roughness within the range of about 0.5 Ra to about 10 Ra; more typically, within the range of about 1.5 Ra to about 5 Ra. We have found that diffusion bonding works quite well when the metal surfaces have a surface roughness within the range of about 1.5 Ra to about 3.0 Ra.

In many cases, the metal surfaces will need to be pretreated by chemical etching, or a combination of mechanical planarization and chemical etching, to have the desired surface roughness prior to diffusion bonding. For example, stainless steel can be chemically etched using ferric chloride according to standard methodology known in the art. A process for electrochemical etching of difficult to etch materials such as HASTELOY is described in U.S. Pat. No. 6,221,235, issued Apr. 24, 2001, to Gebhart. Certain materials may require mechanical planarization to smooth down the surface prior to the performance of a chemical etching process to obtain a surface roughness within the desired range. Mechanical planarization of metal surfaces can be performed according to techniques known in the art.

In some instances, the metal surfaces may be manufactured with the desired surface roughness, and may need no chemical or mechanical pretreatment prior to diffusion bonding. For example, the ASTM standard for surface roughness for stainless steel sheets (as rolled) is 0.5 Ra to 4.0 Ra (ASTM 480 BA).

Once the metal surfaces to be bonded have been polished to the desired surface roughness, diffusion bonding is performed. The particular pressure applied during the diffusion bonding process, and the particular temperature at which the diffusion bonding process is performed, will depend on the materials being bonded. Some typical conditions for forming a successful diffusion bond between similar or dissimilar metal surfaces of the sort that have been discussed above are shown in Table 1, which follows:

TABLE 1

Conditions for Diffusion Bonding of Various Metals

| Materials being Bonded | Temperature | Pressure | Contact Time |
|---|---|---|---|
| HASTELOY C-22 ® to HASTELOY C-22 ® | 90% $T_m$* | 8,000–10,000 psi | 3–5 hours |
| 316L Stainless Steel to 316L SS | 920° C. | 4,000 psi | 4 hours |
| 316L Stainless Steel to HASTELOY C22 | 1250° C. | 8,000 psi | 4 hours |

*$T_m$ = melting temperature.

Figure 3A:
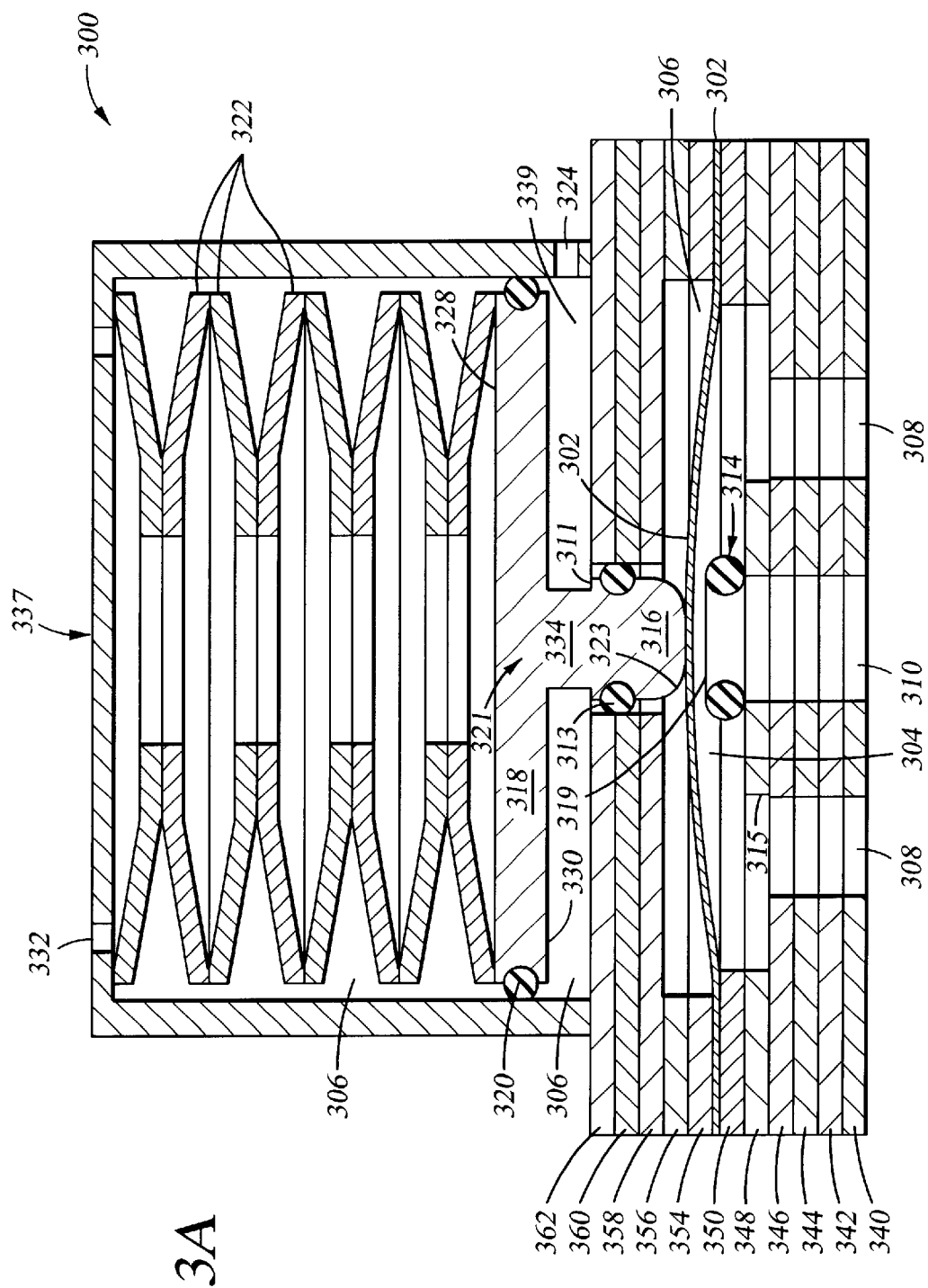
FIG. 3A is a schematic diagram of a cross-sectional view of an embodiment of a control valve 300 which was fabricated using diffusion bonding.
Figure 3B:
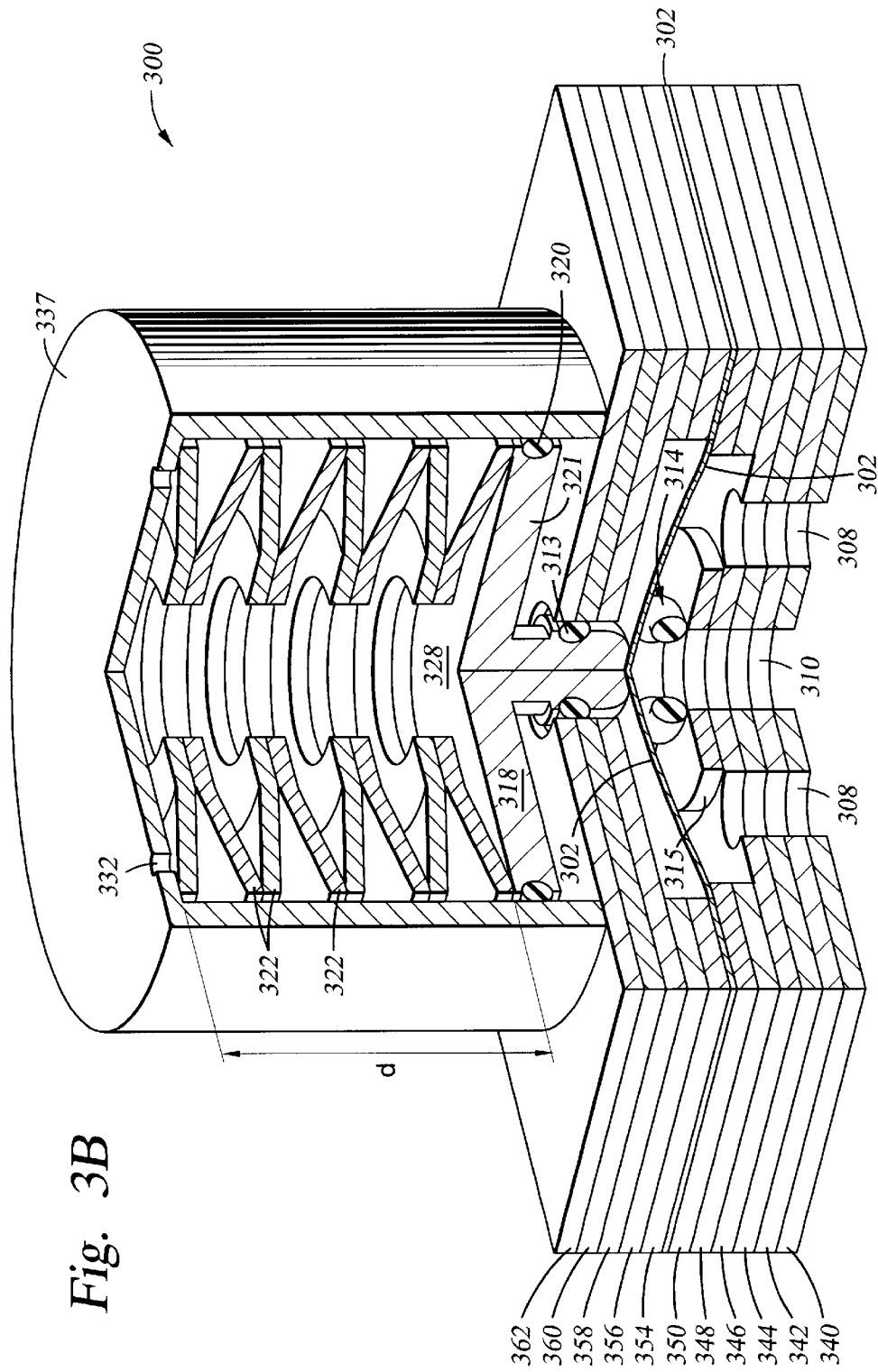
FIG. 3B is a schematic ¾ view of the valve shown in FIG. 3A.

Pressures and temperatures in the ranges shown above would certainly prove deleterious to some materials present in the drive section 106 of the valve, and this must be taken into consideration in the planning of assembly for valve 300 of the kind shown in FIGS. 3A and 3B. For example, in the manufacture of valve 300, a high temperature diffusion bonding process can be run first, to bond layers 340–362 shown in FIGS. 3A and 3B. Since the layers such as 340, and 342, for example, are typically about 0.25 inches (about 6.35 mm) thick, patterns can be wet chemically etched using techniques known in the art, to produce patterned sheet materials for diffusion bonding into valve structures. The chemical etching provides smooth surfaces in the patterned areas, which smooth surfaces appear on the internal wetted valve structure surfaces. This reduces the possibility of contamination of fluids flowing through the valve. The assembled, bonded structure may employ complex shapes without the need for complicated and costly machining. Other components (such as the sliding cylinder 321, sliding seals 313 and 320, and/or metallic seat 314) may be inserted afterward. The piston portion 316 of sliding cylinder 321 can be lifted out prior to diffusion bonding, which is carried out before assembly. Then seat 314 can be dropped in. Alternatively, the seat 314 can be diffusion bonded to the body at the same time that the side pieces are diffusion bonded, by applying a different pressure to the seat 314. It is important to be careful not to exceed the elastic limit of the metal while applying pressure to seat 314.

Diffusion bonding techniques (such as described above) can be used in the manufacture of other gas handling elements, such as flow rate controllers, filters, and sensors, for example and not by way of limitation.

In the valve's drive section 306, above the diaphragm 302 which isolates the wetted section 304, the sliding cylinder 321 moves in and out, such that the convex surface 323 of lower horizontal member 316 of sliding cylinder 321 presses against diaphragm 302 to restrict the flow of fluids within wetted section 304. The motion of sliding cylinder 321 is achieved by balancing the force applied to upper horizontal member 318 (which is tied by vertical member 334 to lower horizontal member 316) by a spring 322 positioned within housing 337, and the force applied to lower horizontal member 316 by a fluid present in a pneumatic chamber 339. The sliding cylinder 321 has a gas-tight sliding seal (typically an "O-Ring") 320 around the perimeter of upper horizontal member 318, and a gas-tight sliding seal 313 around the perimeter of lower horizontal member 316. Since the sliding seals do not contact fluids passing through valve 300, they need not be metal, and may comprise a polymeric material. The sliding seals (O-rings) 320 and 313 are typically fabricated from an elastomeric material.

The valve 300 is maintained in a normally-closed position by force applied by spring 322 upon upper horizontal member 318 of sliding cylinder 321. When the valve seat 314 is metallic, the seating force required for absolute shutoff (a fluid flow of less than $1\times10^{-9}$ cc/sec for at least 15 seconds, at a pressure difference of 1 atm He across the valve) is in the range of 1000 N/cm$^2$ at the sealing contact surface 319 of valve seat 314. This translates to roughly 200 to 250 Newtons of force for an annular valve seat 314 having an exterior diameter of about 0.70 cm and a total contact surface area of about 0.233 cm$^2$. FIGS. 3A and 3B show the spring 322 used to apply force to the upper surface 328 of upper horizontal member 318 as a "Belleville" spring. The application of Belleville springs typically takes the shape of a series of coned disks stacked atop one another, concave side to convex side, as illustrated in FIGS. 3A and 3B. A Belleville spring provides the closing force required within a much smaller vertical distance "d" than would be required by a coil spring. This permits a much shorter valve actuator than can be achieved using coil springs. The metal-seated valve shown in FIG. 1 using coil springs to provide tight shutoff would typically require a "d" ranging from about 1.00 cm to about 1.25 cm, while a Belleville spring would typically require a "d" ranging from about 0.020 cm to about 0.025 cm.

The valve 300 is opened by pneumatic force, which is applied by admitting pressurizing gas (not shown) into the pneumatic chamber 309. Since the movable surface area 330 of upper horizontal member 318 of sliding cylinder 321 is much larger than the movable surface area 311 of lower horizontal member 316, the pressurizing gas provides an upward motion against the operation of spring 322. The pressurizing gas (not shown) is admitted through one or more ports 324 from an external gas supply 326. The pneumatic pressure behind upper horizontal member 318 then overcomes the countervailing spring 322 force, urging the sliding cylinder 321 upward, in proportion to the amount of pressure applied via the pressuring gas. As sliding cylinder 321 moves upward, lower horizontal member 316 moves upward, relieving pressure upon diaphragm 302, which moves away from the metallic valve seat 314, opening the valve by an amount in proportion to the pressure applied via the pressurizing gas. For a valve of the kind shown in FIGS. 3A and 3B, where the movable surface area 330 is about 1.5 cm$^2$, the movable surface area 311 is about 0.40 cm$^2$, and the downward force applied by spring 322 to surface 328 of upper horizontal member 318 to crack the valve open is about 220 N. The pressurizing gas pressure applied will be in the range of about 1,480 kPa for an 8 spring valve to open the valve and will be in the range of about 2,220 kPa to provide full flow. In the event that the pressurizing gas leaks past the sliding seals 320, the gas can vent out through opening(s) 332 in housing 337.

In the drive section 306 of the valve 300, required metal-to-metal bonding may be advantageously accomplished using high-strength adhesives. While adhesives typically do not provide quite as strong or reliable a bond as diffusion bonding, they do not require subjecting the valve mechanicals present in the drive section 306 to the much higher temperatures and pressures involved in performing the diffusion bonding used in the wetted section 304. Adhesives are also much cheaper and simpler to use than diffusion bonding. Adhesives used in this application typically provide a shear strength of not less than 3,000 psi and a shear modulus of not less than 45,000 psi at 24° C. One example of an adhesive which has been satisfactory for this application is SCOTCH-WELD™ epoxy adhesive 2216 (B/A grey), which may be applied and bonding processed in the manner recommended by the manufacture, with respect to the particular materials being bonded. This particular adhesive acts as a sealant as well as an adhesive. One skilled in the art will be able to find other adhesive/sealant compositions which can be used in this application which typically requires functionality at room temperature up to about 40° C. For higher temperature applications, an adhesive/sealant having higher temperature functionality could be selected.

The above-described embodiment is provided to enable one skilled in the art to understand the concepts which are disclosed and claimed herein, and is not intended to limit the scope of the present invention. One skilled in the art, in view of the disclosure in this application may expand the concepts and the materials which may be used for various elements of the valve, to correspond with the subject matter of the invention claimed below.

We claim:

1. A compact valve for controlling the flow of various process fluids, comprising:
   a fluid-wetted section, including a lower body section and a diaphragm which, in combination, enclose other elements of said wetted section, wherein a fluid enters said lower body section through one or more inlet ports and exits through at least one exit port present in said lower body section, and wherein said exit port has, formed as part of or upon an inner lip thereof, an annular metallic valve seat, and wherein said valve is closed to flow of said process fluids when said diaphragm is pressed sufficiently tightly against said metallic valve seat;
   a non-fluid-wetted drive section, including a sliding cylinder which comprises an upper horizontal member which is pressure sealed against a first upper body surface of said valve and a lower horizontal member, which is shorter than said upper horizontal member, which is pressure sealed against a second upper body surface of said valve so that a pneumatic chamber is formed between said upper horizontal member and said lower horizontal member, wherein said upper horizontal member is tied to said lower horizontal member, and wherein said sliding cylinder moves up and down above said diaphragm depending on the pneumatic force in said pneumatic chamber, whereby a surface of said lower horizontal member presses against said diaphragm at least periodically, wherein a spring pushes against a top surface of said upper horizontal member and a controlled pneumatic force is applied in said pneumatic chamber, pushing against a bottom surface of said upper horizontal member, and wherein a balance between said spring and said pneumatic force determines an extent to which said valve is open to fluid flow.

2. A valve in accordance with claim 1, wherein said metal valve seat deformation is substantially elastic when valve is closed.

3. A valve in accordance with claim 1, wherein metal bonding in said fluid-wetted section of said valve is diffusion bonded.

4. A valve in accordance with claim 1 or claim 2, wherein metal bonding in said non-fluid-wetted drive section of said valve is bonded by at least one high strength adhesive.

5. A valve in accordance with claim 1, wherein said diaphragm is a metallic diaphragm.

6. A valve in accordance with claim 5, wherein both said metallic valve seat and said metallic diaphragm are fabricated from at least one corrosion-resistant metal.

7. A valve in accordance with claim 1, or claim 2, or claim 3, or claim 5, or claim 6, wherein said spring comprises at least one conically-shaped disk.

8. A valve in accordance with claim 7, wherein said at least one spring is a spring assembly comprising a Belleville spring.

9. A valve in accordance with claim 1 or claim 2 or claim 3, which is used in the delivery of fluids to semiconductor fabrication apparatus.

10. A valve in accordance with claim 1 or claim 2 or claim 3, which is formed from layered metal sheet components, where a surface of a metal sheet component was chemically etched to promote bonding to said surface.

11. A method of handling gas used in semiconductor processing operations, wherein said gas travels through the valve of claim 1.

* * * * *